(12) United States Patent
Kondou et al.

(10) Patent No.: US 12,503,019 B2
(45) Date of Patent: Dec. 23, 2025

(54) VEHICLE SEAT

(71) Applicants: TOYOTA JIDOSHA KABUSHIKI KAISHA, Toyota (JP); TOYOTA BOSHOKU KABUSHIKI KAISHA, Kariya (JP)

(72) Inventors: Keiichi Kondou, Chiryu (JP); Kazuhisa Niimi, Nisshin (JP); Yuto Kamiya, Nisshin (JP)

(73) Assignees: TOYOTA JIDOSHA KABUSHIKI KAISHA, Toyota (JP); TOYOTA BOSHOKU KABUSHIKI KAISHA, Kariya (JP)

( * ) Notice: Subject to any disclaimer, the term of this patent is extended or adjusted under 35 U.S.C. 154(b) by 171 days.

(21) Appl. No.: 18/543,841

(22) Filed: Dec. 18, 2023

(65) Prior Publication Data

US 2024/0208379 A1    Jun. 27, 2024

(30) Foreign Application Priority Data

Dec. 26, 2022    (JP) .................................. 2022-208643

(51) Int. Cl.
*B60N 2/42*    (2006.01)
*B60N 2/68*    (2006.01)

(52) U.S. Cl.
CPC .......... *B60N 2/4221* (2013.01); *B60N 2/686* (2013.01)

(58) Field of Classification Search
CPC ..... B60N 2/3047; B60N 2/686; B60N 2/4221
See application file for complete search history.

(56) References Cited

U.S. PATENT DOCUMENTS

| | | | | |
|---|---|---|---|---|
| 6,328,379 B1 * | 12/2001 | Merrick | ............... | B60N 2/4221 |
| | | | | 297/216.1 |
| 6,827,394 B2 * | 12/2004 | Watanabe | ................ | B60N 2/36 |
| | | | | 296/65.01 |
| 7,350,867 B2 * | 4/2008 | Park | ......................... | B60N 2/12 |
| | | | | 297/331 |
| 7,850,220 B2 * | 12/2010 | Holdampf | ............ | B60N 2/3075 |
| | | | | 296/65.09 |
| 9,669,740 B2 * | 6/2017 | Hansen | ................ | B60N 2/3097 |
| 9,873,354 B2 * | 1/2018 | Poulos | ................... | B60N 2/062 |
| 11,059,392 B1 * | 7/2021 | Alexander | ............... | B60N 2/12 |
| 11,760,242 B2 * | 9/2023 | Reith | ....................... | B60N 2/72 |
| | | | | 297/394 |

(Continued)

FOREIGN PATENT DOCUMENTS

| | | | | | |
|---|---|---|---|---|---|
| CN | | 119734623 A | * | 4/2025 | ............. B60N 2/686 |
| DE | 102013002185 A1 | * | 1/2014 | ............... B60N 2/70 |

(Continued)

*Primary Examiner* — Timothy J Brindley
(74) *Attorney, Agent, or Firm* — Dinsmore & Shohl LLP

(57) ABSTRACT

A vehicle seat including a pipe frame formed in the shape of a hollow rectangle constituting a part of a sitting portion, a pair of side frames respectively attached to a left side and a right side of the pipe frame to connect the pipe frame to a structural member of a vehicle, a cross bracket attached to rear regions of the pair of side frames to connect between the pair of side frames in a lateral direction, and a bottom cover disposed to cover the underside of the pipe frame, in which a rear portion of the bottom cover is attached to the cross bracket, and a front portion of the bottom cover is attached to the pipe frame.

2 Claims, 5 Drawing Sheets

(56) References Cited

U.S. PATENT DOCUMENTS

| | | | |
|---|---|---|---|
| 11,890,975 B2 * | 2/2024 | Shin | B60N 2/3011 |
| 12,139,259 B2 * | 11/2024 | Mansouri | B32B 15/046 |
| 12,194,896 B2 * | 1/2025 | Jeong | B60N 2/2209 |
| 12,269,372 B2 * | 4/2025 | You | B60N 2/3045 |
| 2023/0322132 A1 * | 10/2023 | Schupska | B60N 2/36 |
| | | | 296/65.03 |
| 2025/0083580 A1 * | 3/2025 | Kang | B60N 2/3004 |
| 2025/0214497 A1 * | 7/2025 | Fitzpatrick | B60N 2/68 |

FOREIGN PATENT DOCUMENTS

| | | | | |
|---|---|---|---|---|
| FR | 2985467 A1 * | 7/2013 | | B60N 2/682 |
| GB | 2087226 A * | 5/1982 | | B60N 2/4221 |
| JP | 2013-043537 A | 3/2013 | | |
| JP | 2015-033928 A | 2/2015 | | |
| JP | 2016-026952 A | 2/2016 | | |

\* cited by examiner

FIG. 3   A-A CROSS SECTION

VEHICLE SEAT

CROSS REFERENCE TO RELATED APPLICATION

This application claims priority to Japanese Patent Application No. 2022-208643 filed on Dec. 26, 2022, which is incorporated herein by reference in its entirety including the specification, claims, drawings, and abstract.

TECHNICAL FIELD

The present disclosure relates to the structure of a vehicle seat.

BACKGROUND

In place of a seat using a cushion material, a vehicle seat having a sitting portion composed of a panel is employed in JP 2016-26952 A. In this vehicle seat, the panel is formed of a resin or a fiber material. In this connection, JP 2013-43537 A discloses a structure in which a resin panel constituting a sitting portion is fixed to a metallic skeleton frame using a lot of bolts. Further, JP 2015-33928 A discloses a seat in which a resin frame including an insert molded metallic side frame is disposed on each of side edges of the seat, and further describes that a notch is formed on the side frame for causing the side frame to absorb an impact load applied at an occurrence of a head-on collision, to thereby prevent damage to the resin frame.

Meanwhile, there are foldable vehicle seats in which a bottom cover is mounted to cover an undersurface of the seat. Upon occurrence of a head-on collision of a vehicle, the buttocks of a vehicle occupant are forced to move forward, thereby exerting a downward force along a slanting forward direction of the vehicle onto a seat surface panel which supports a sitting portion. The downward force may cause a front region of a frame, onto which the seat surface panel is fixed, to be downwardly bent. At this time, in a case where the bottom cover is attached to the frame, the bottom cover may be detached and fall off from the frame due to deformation of the frame.

With this in view, it is an object of the present disclosure to prevent a bottom cover in a vehicle seat from falling off upon occurrence of a head-on collision.

SUMMARY

A vehicle seat according to this disclosure includes a pipe frame formed in the shape of a hollow rectangle and constituting a part of a sitting portion, a pair of side frames respectively attached to a right side and a left side of the pipe frame and configured to connect the pipe frame to a structural member of a vehicle, a cross bracket attached to rear portions of the pair of side frames to connect between the pair of side frames in a lateral direction, and a bottom cover configured to cover an underside of the pipe frame, in which a rear portion of the bottom cover is attached to the cross bracket and a front portion of the bottom cover is attached to the pipe frame.

In the above-described configuration, because the rear portion of the bottom cover is attached to the cross bracket, even when a rear pipe in the pipe frame is shifted upward due to a head-on collision of the vehicle, there can be prevented the action of bottom cover detaching from the cross bracket and falling off.

In an aspect of this disclosure, the vehicle seat may further include an under seat panel placed within the hollow rectangle of the pipe frame, and a resin seat surface panel attached to the under seat panel on an upper side thereof and configured to receive a vehicle occupant seated thereon, in which a plurality of through holes may be defined in the under seat panel, and the seat surface panel may be provided with a plurality of protrusions designed to be fitted into corresponding through holes among the plurality of through holes, to thereby fix the seat surface panel in a direction along a top surface of the under seat panel.

Upon occurrence of a head-on collision, a forwardly oblique downward force is exerted onto the seat surface panel by the vehicle occupant forced to move forward by the head-on collision, and the downward force is transmitted via the plurality of protrusions to the under seat panel. Therefore, the seat surface panel is not allowed to move along the top surface of the under seat panel, which can prevent detachment of the seat surface panel from the under seat panel.

In a vehicle seat according to another aspect of this disclosure, the under seat panel may have a clip hole through which a clip is inserted, the seat surface panel may be connected to the under seat panel on the upper side thereof by the clip inserted into the clip hole, and a gap may be defined between the inner diameter of the clip hole and the outer diameter of the clip.

In the above-described configuration, a load exerted in the direction along the top surface of the under seat panel at the occurrence of a head-on collision is not transmitted to the clip. This can prevent the clip from getting damaged upon the occurrence of a head-on collision.

The present disclosure provides a vehicle seat in which the bottom cover can be prevented from falling off at the occurrence of a head-on collision.

BRIEF DESCRIPTION OF DRAWINGS

Embodiments of the present disclosure will be described based on the following figures, wherein.

DESCRIPTION OF EMBODIMENTS

Figure 1:
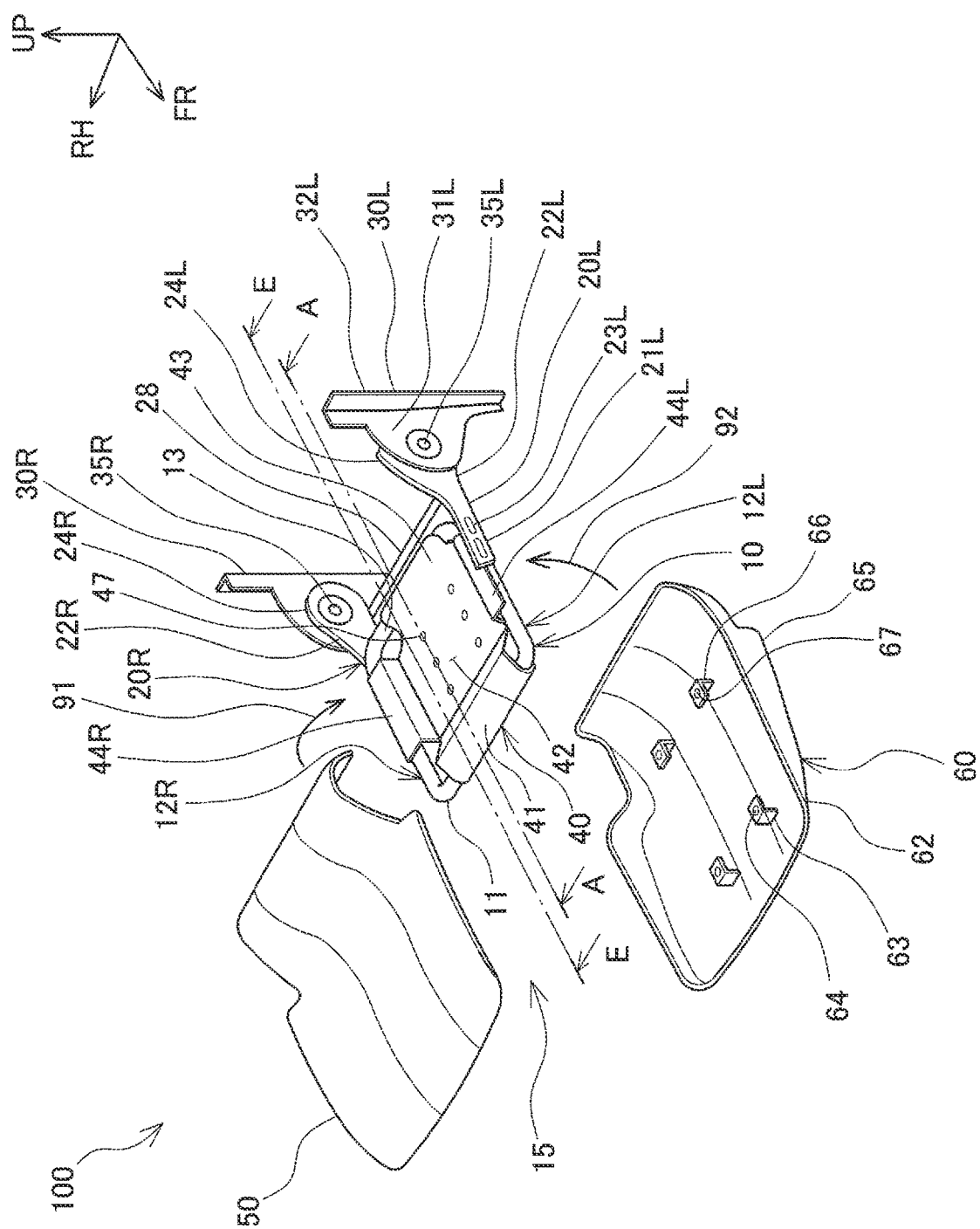
FIG. 1 is an exploded perspective view of a vehicle seat according to an embodiment.

Hereinafter, a configuration of a vehicle seat 100 according to an embodiment will be explained with reference to the drawings. Arrows FR, UP, and RH shown in the drawings represent a forward direction, an upper direction, and a rightward direction of the vehicle seat 100, respectively. Directions opposite to the arrows FR, UP, and RH correspond to a rearward direction, a lower direction, and a leftward direction of the vehicle seat 100, respectively. In the following description, unless otherwise specified, the expressions front and rear, right and left, and up and down respectively denote front and rear in a longitudinal direction, right and left in a lateral direction, and up and down in a vertical direction of the vehicle seat 100. It should be noted that the vehicle seat 100 is mounted on a vehicle with a front side of the vehicle seat 100 being located forward in a vehicle. Therefore, in a state of the vehicle seat 100 mounted on the vehicle, the longitudinal direction, the lateral direction, and the vertical direction of the vehicle seat 100 respectively match a longitudinal direction, a lateral direction, and a vertical direction of the vehicle.

Figure 2:
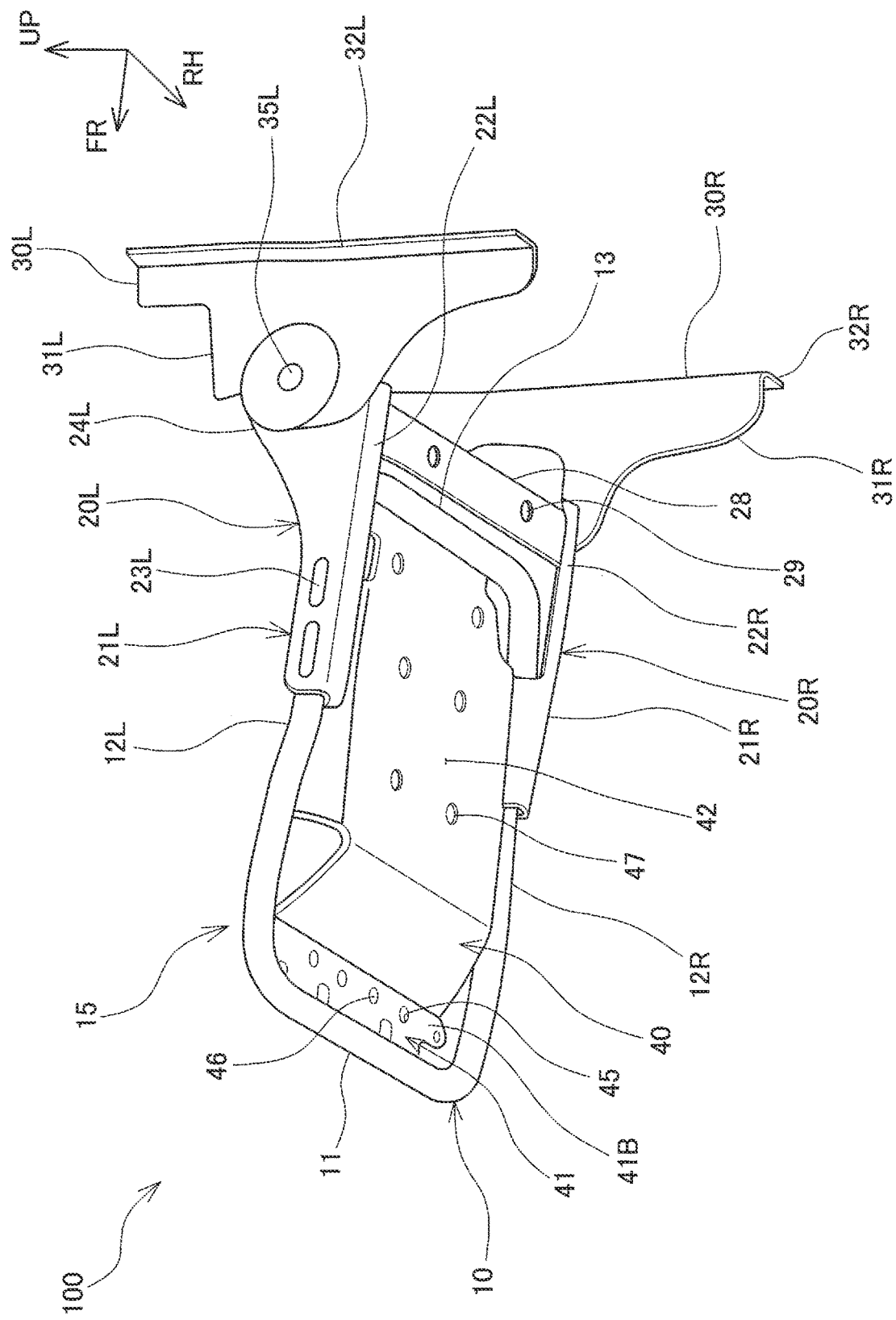
FIG. 2 is a perspective view of the vehicle seat according to the embodiment that is obliquely viewed from below.

As shown in FIGS. 1 and 2, the vehicle seat 100 includes a pipe frame 10, a left side frame 20L, a right side frame 20R, a left bracket 30L, a right bracket 30R, a cross bracket 28, an under seat panel 40, a seat surface panel 50, and a bottom cover 60.

The pipe frame 10 is formed of a round metal pipe which is looped so as to form a hollow rectangle. The pipe frame 10 is composed of a front pipe 11, a left pipe 12L, a right pipe 12R, and a rear pipe 13.

The left side frame 20L is composed of a front portion 21L, a rear portion 22L, and a hinge portion 24L. The front portion 21L is formed in the shape of the letter U. The left pipe 12L is fixed to the inside of the front portion 21L by welding. The front portion 21L and the left pipe 12L are welded to each other at a welding region 23L. The rear portion 22L is formed in the shape of the letter U in which an outer plate is raised upward. The raised outer plate constitutes the hinge portion 24L.

The left bracket 30L is composed of a main body 31L and a fixation flange 32L. The main body 31L is formed in a flat plate shape and configured to rotatably retain the hinge portion 24L via a pin 35L. The fixation flange 32L is fixed to a structural member of the vehicle that is not shown in the diagram.

The right side frame 20R is composed of a front portion 21R, a rear portion 22R, and a hinge portion 24R. The right side frame 20R and the left side frame 20L are mirror symmetrical. The right side frame 20R and the left side frame 20L constitute a side frame pair. The right pipe 12R is fixed to the front portion 21R by welding. The right bracket 30R is composed of a main body 31R and a fixation flange 32R. The right bracket 30R and the left bracket 30L are mirror symmetrical. The main body 31R is formed in a flat plate shape and configured to rotatably retain the hinge portion 24R via a pin 35R. The fixation flange 32 is fixed to a not-illustrated reinforcement member of the vehicle.

The right and left side frames 20R and 20L are pivotable between a seated position with the seat surface panel 50 located forward the right and left side frames 20R and 20L, and a stored position with the seat surface panel 50 located upward with respect to the right and left side frames 20R and 20L. Further, such pivoting movement of the right and left side frames 20R and 20L can be fixed in either the seated position or the stored position.

As shown in FIG. 2, the cross bracket 28 is a band plate member connecting, in the lateral direction, a lower end in the rear portion 22L of the left side frame 20L and a lower end in the rear portion 22R of the right side frame 20R. A plurality of clip holes 29 are defined in the cross bracket 28.

The under seat panel 40 is a metal plate member placed within the hollow rectangle of the pipe frame 10. As shown in FIG. 1, the under seat panel 40 is composed of a front plate member 41, a rear plate member 43, a left end member 44L, a right end member 44R, and a center member 42.

Figure 3:
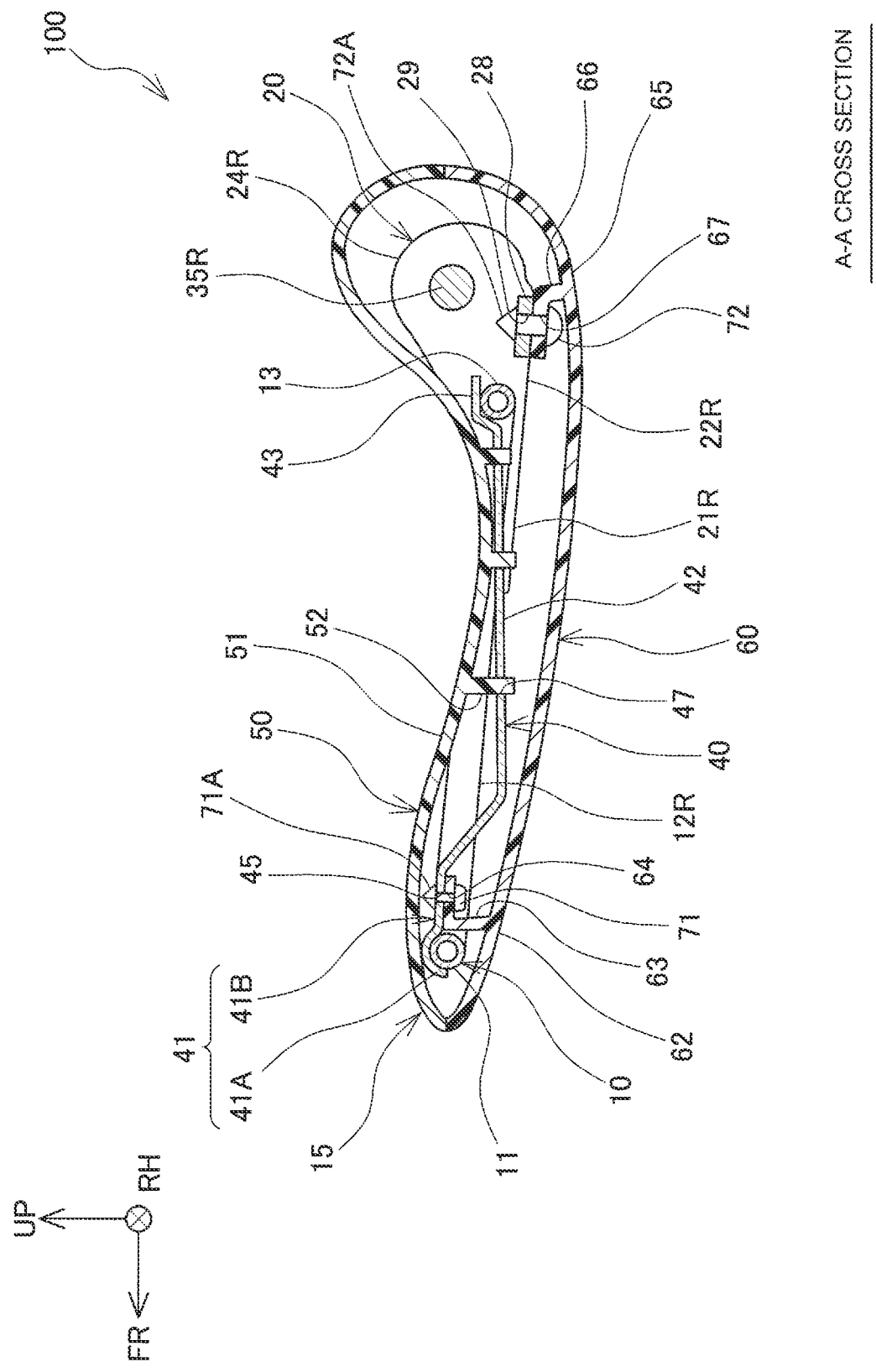
FIG. 3 is a cross sectional view of the vehicle seat according to the embodiment taken along a line A-A indicated in FIG. 1.
Figure 4:
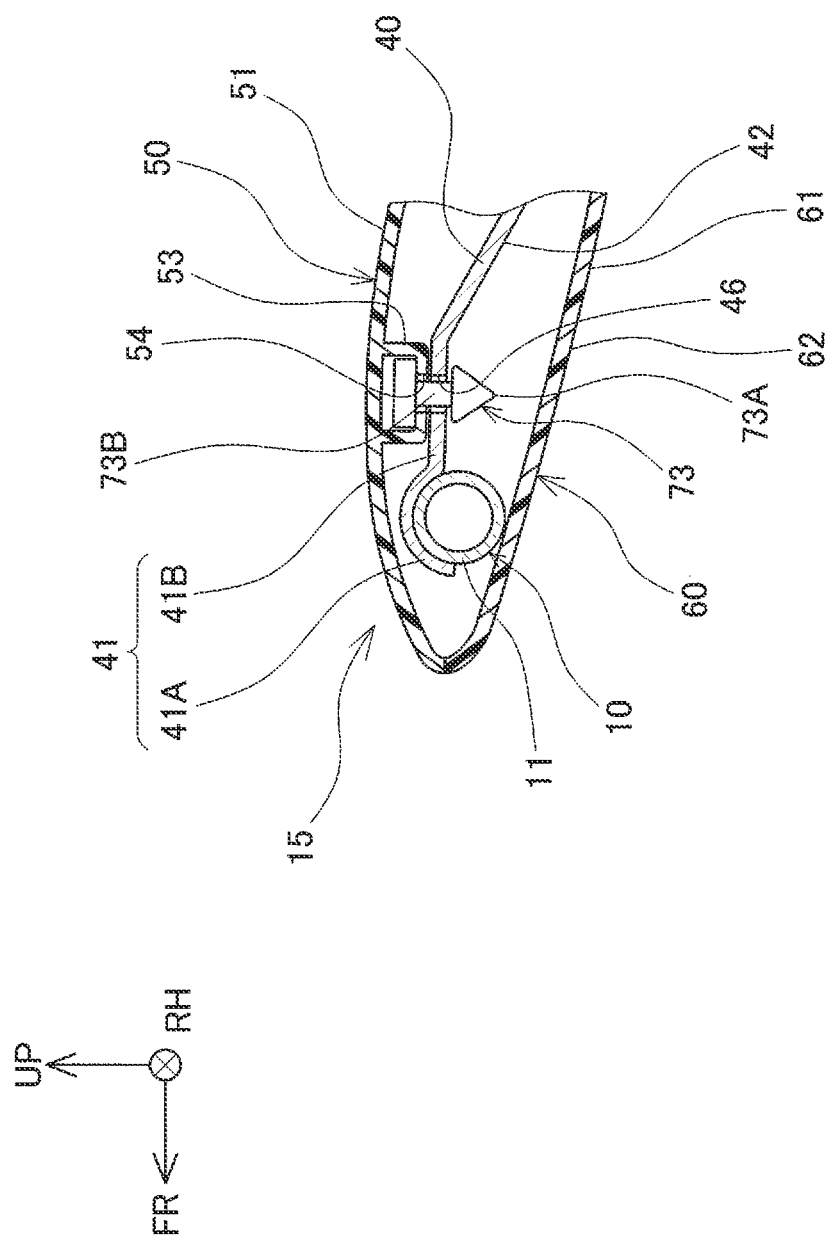
FIG. 4 is a cross sectional view showing a connection between a seat surface panel and an under seat panel.

As shown in FIG. 3, the front plate member 41 includes both a half cylinder region 41A placed on the front pipe 11 so as to cover a top part thereof and a flat plate region 41B extending rearward from the half cylinder region 41A. As shown in FIG. 2, a plurality of clip holes 45 and 46 are defined in the flat plate region 41B. As shown in FIG. 3, a clip 71 for fixing the bottom cover 60 is inserted into the clip hole 45. On the other hand, as shown in FIG. 4, a clip 73 for fixing the seat surface panel 50 is inserted into the clip hole 46.

Further, as shown in FIG. 3, the rear plate member 43 is an L-shaped member designed to rest on the top of the rear pipe 13. As shown in FIG. 1, the right end member 44R is an L-shaped member designed to rest on the top of the right pipe 12R. Similarly, the left end member 44L is an L-shaped member designed to rest on the top of the left pipe 12L. The center member 42 is joined to the flat plate region 41B of the front plate member 41, the lower end of the rear plate member 43, the lower end of the right end member 44R, and the lower end of the left end member 44L. The center member 42 is placed within the hollow rectangle of the pipe frame 10. The center member 42 has a plurality of through holes 47.

The seat surface panel 50 is a resin plate member attached to the under seat panel 40 on the upper side thereof. As shown in FIGS. 3 and 4, the seat surface panel 50 includes a main body 51, protrusions 52, and a clip holder 53. As can be seen in FIG. 3, the protrusions 52 are formed in the shape of a round bar protruding downward from the undersurface of the seat surface panel 50. The protrusions 52 are arranged at positions corresponding, on a one-by-one basis, to the through holes 47 defined in the under seat panel 40. Each of the protrusions 52 is inserted into a corresponding one of the through holes 47 in the under seat panel 40. As shown in FIG. 4, the clip holder 53 is a groove shaped member projecting downward from the undersurface of the main body 51 in a forward region thereof. The clip holder 53 is designed to retain in its groove the head of the clip 73. The bottom of the clip holder 53 has a clip hole 54 through which a shank 73B of the clip 73 is inserted.

The bottom cover 60 is a resin plate member designed to cover the underside of the pipe frame 10. The bottom cover 60 includes a front portion 62, a rear portion 65, and a bottom surface 61. As shown in FIG. 3, the upper surface of the front portion 62 is provided with a clip holder 63 designed to hold the head of the clip 71. The clip holder 63 is an L-shaped member extending upward in an inverted L shape from the upper surface of the front portion 62. An upper flange of the clip holder 63 has a clip hole 64 into which the clip 71 is inserted. The clip hole 64 is arranged at a position corresponding to the clip hole 45 defined in the under seat panel 40. In addition, an upper surface of the rear portion 65 is provided with a clip holder 66 designed to hold the head of the clip 72. The clip holder 66 is an L-shaped member extending upward in an inverted L shape from the upper surface of the rear portion 65. An upper flange of the clip holder 66 has a clip hole 67 into which the clip 72 is inserted. The clip hole 67 is arranged at a position corresponding to the clip hole 29 defined in the cross bracket 28.

When the vehicle seat 100 is set to the seated position, the center member 42 of the under seat panel 40 receives from the seat surface panel 50 an occupant sitting load. The sitting load received by the center member 42 is transmitted via the front plate member 41, the rear plate member 43, the right end member 44R, and the left end member 44L to the pipe frame 10. The load received by the pipe frame 10 is transmitted via the left side frame 20L, the right side frame 20, the left bracket 30L, and the right bracket 30R to a structural member (not-illustrated) of the vehicle. In addition, the seat surface panel 50, the under seat panel 40, and the pipe frame 10 constitute a sitting portion 15 of the vehicle seat 100.

Hereinafter, a manner of attaching the seat surface panel 50 and the under seat cover 60 is described.

The seat surface panel 50 is attached to the under seat panel 40 on the upper side thereof as indicated by an arrow 91 in FIG. 1. The seat surface panel 50 is fixed to the under seat panel 40 by inserting, as shown in FIG. 3, each of the protrusions 52 into a corresponding one of the through holes 47 in the under seat panel 40; inserting, as shown in FIG. 4, a tip end of the clip 73 through the clip hole 46 in the under seat panel 40; and engaging a lug 73A with the circumferential edge of the clip hole 46. Here, because the inner diameter of each of the through holes 47 is substantially equal to the outer diameter of each of the protrusions 52, the protrusions 52 are engaged with the corresponding through holes 47 by inserting the protrusions 52 in the through holes 47. In this way, the protrusions 52 function to prevent movement of the seat surface panel 50 relative to the under seat panel 40 in both longitudinal and lateral directions. It should be noted that the longitudinal and lateral directions denote directions conforming the surface of the under seat panel 40. On the other hand, the diameter of the clip hole 46 is greater than the diameter of the shank 73B of the clip 73, which leaves a gap between the inner diameter of the clip hole 46 and the outer diameter of the shank 73B.

The bottom cover 60 is attached, as indicated by an arrow 92 in FIG. 1, to both an underside of the under seat panel 40 and an underside of the cross bracket 28. As shown in FIG. 3, the front portion 62 of the bottom cover 60 is fixed to the under seat panel 40 by inserting the tip end of the clip 71 into the clip hole 45 defined in the front plate member 41 of the under seat panel 40, and engaging a lug 71A with a circumferential edge of the clip hole 45. In addition, as shown in FIG. 3, the rear portion 65 of the bottom cover 60 is fixed to the cross bracket 28 by inserting a tip end of the clip 72 into the clip hole 29 defined in the cross bracket 28, and engaging a lug 72A with a circumferential edge of the clip hole 29.

Figure 5:
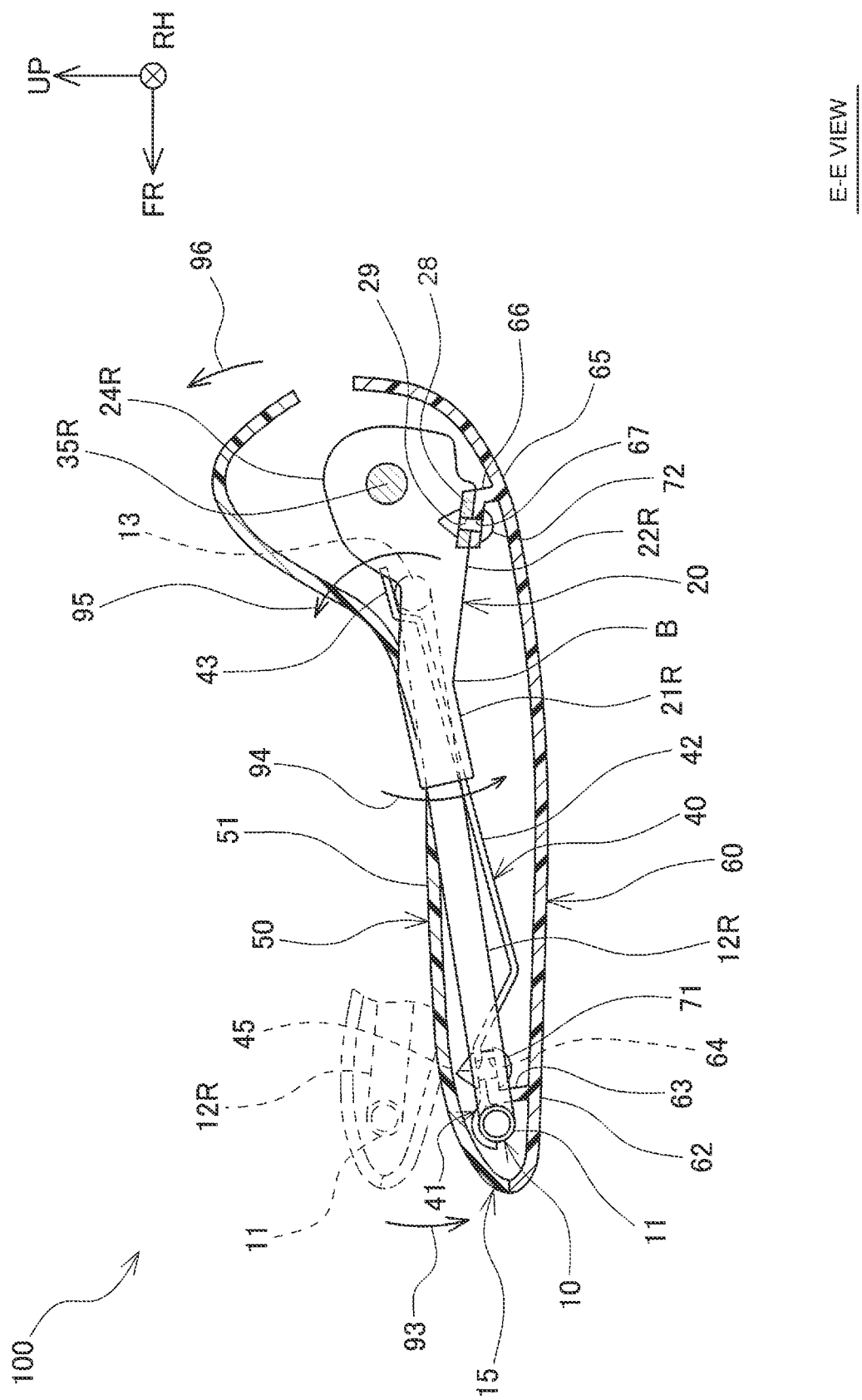
FIG. 5 is a cross sectional view showing deformation of the vehicle seat upon occurrence of a head-on collision, that is viewed along E-E arrows indicated in FIG. 1.

Upon the occurrence of a head-on collision of the vehicle equipped with the vehicle seat 100 described above, the forwardly oblique downward force is exerted onto the seat surface panel 50. The downward force causes the front portion 21R of the right side frame 20R to be deformed as indicated by an arrow 94 in FIG. 5 in such a manner that the front portion 21R is bent at a bending point B toward an oblique downward direction. The front portion 21L of the left side frame 20L, which is not illustrated in FIG. 5, is similarly deformed while being bent toward the oblique downward direction.

The pipe frame 10 is fixed by welding to both the front portion 21L and the front portion 21R. For this reason, the above-described deformation of the front portions 21L and 21R causes the front pipe 11 to move downward as indicated by an arrow 93 in FIG. 5, and also causes the rear pipe 13 to move upward as indicated by an arrow 95 in FIG. 5. The front plate member 41 of the under seat panel 40 fixed to the front pipe 11 is moved downward together with the front pipe 11, while the rear plate member 43 of the under seat panel 40 fixed to the rear pipe 13 is moved upward together with the rear pipe 13. In some embodiments, a rear end of the seat surface panel 50 is caused to move upward as indicated by an arrow 96 in FIG. 5.

The front portion 62 of the bottom cover 60, which is fixed to the front plate member 41 of the under seat panel 40, is caused by the front plate member 41 to move downward together with the front plate member 41. On the other hand, the rear portion 65 of the bottom cover 60 is fixed to the cross bracket 28 connected between the rear portion 22R of the right side frame 20R and the rear portion 22L of the left side frame 20L. Because the rear portions 22L and 22R are not deformed upon the head-on collision, the position of the rear portion 65 is not moved. Then, movement of the front portion 62 is absorbed by deformation of a plate region between the front portion 62 and the rear portion 65. In this way, the clips 71 and 72 are prevented from getting damaged upon the occurrence of the head-on collision, which can, in turn, prevent the bottom cover 60 from falling off upon the occurrence of a head-on collision of the vehicle.

In addition, the forwardly oblique downward force is transmitted through the protrusions 52 and the through holes 47 to the center member 42 of the under seat panel 40. On the other hand, because there is a gap between the inner diameter of the clip hole 46 and the outer diameter of the shank 73B as shown in FIG. 4, the forwardly oblique downward force is not transmitted to the clip 73. This can protect the clip 73 from getting damaged upon the occurrence of the head-on collision, which can, in turn, prevent a situation that the seat surface panel 50 is shifted in the longitudinal direction upon the head-on collision, resulting in detachment of seat surface panel 50 from the under seat panel 40.

As has been described above, the vehicle seat 100 is able to protect the bottom cover 60 from falling off at the occurrence of a head-on collision. Further, the vehicle seat 100 is also able to protect the seat surface panel 50 from getting detached upon the occurrence of a head-on collision.

The invention claimed is:

1. A vehicle seat, comprising:
    a pipe frame pipe formed in the shape of a hollow rectangle and constituting a part of a sitting portion;
    a pair of side frames respectively attached to a left side and a right side of the pipe frame and configured to connect the pipe frame to a structural member of a vehicle;
    a cross bracket attached to rear portions of the pair of side frames to connect between the pair of side frames in a lateral direction;
    a bottom cover configured to cover an underside of the pipe frame;
    an under seat panel placed within the hollow rectangle of the pipe frame; and
    a resin seat surface panel attached to the under seat panel on an upper side thereof, and configured to receive a vehicle occupant seated thereon,
    wherein a rear portion of the bottom cover is attached to the cross bracket, and a front portion of the bottom cover is attached to the pipe frame,
    wherein a plurality of through holes are defined in the under seat panel, and
    wherein the seat surface panel is provided with a plurality of protrusions designed to be fitted into corresponding through holes among the plurality of through holes in the under seat panel, to thereby fix the seat surface panel in a direction along a top surface of the under seat panel.

2. The vehicle seat according to claim 1, wherein:
    the under seat panel has a clip hole through which a clip is inserted; and
    the seat surface panel is connected to the under seat panel on an upper side thereof by the clip inserted through the clip hole, and
    a gap is defined between the inner diameter of the clip hole and the outer diameter of the clip.

* * * * *